United States Patent [19]

Dulin

[11] 4,120,829

[45] Oct. 17, 1978

[54] ELECTRICALLY SEMI-CONDUCTING CERAMIC BODY

[75] Inventor: Francis H. Dulin, Oakland Township, Oakland County, Mich.

[73] Assignee: Champion Spark Plug Company, Toledo, Ohio

[21] Appl. No.: 672,153

[22] Filed: Mar. 31, 1976

Related U.S. Application Data

[63] Continuation-in-part of Ser. No. 321,563, Jan. 8, 1973, abandoned.

[51] Int. Cl.² ............................................. H01B 1/04
[52] U.S. Cl. ...................................... 252/516; 106/44; 252/521
[58] Field of Search ............... 252/516, 521; 106/73.5, 106/44

[56] References Cited

U.S. PATENT DOCUMENTS 3,509,072  4/1970  Barrington et al. ................. 252/516
3,607,790  9/1971  Pitha ................................... 252/516

*Primary Examiner*—Benjamin R. Padgett
*Assistant Examiner*—E. Suzanne Parr
*Attorney, Agent, or Firm*—John C. Purdue

[57] ABSTRACT

A fired, electrically semi-conducting ceramic body is disclosed. The body consists essentially of silicon carbide particles having a median particle size from about 3 to about 25 microns dispersed in a bonding matrix. The silicon carbide particles constitute from about 50 to about 70 percent of the body. The body has an "apparent porosity" as subsequently defined herein from 20 to 40. The production of such a body from a batch composed of silicon carbide, alumina, silica and at least one oxide, carbonate or hydroxide of calcium, magnesium, barium or strontium is also disclosed. The batch is milled and pressed into a shape, and the resulting shape is then fired in an inert gas atmosphere to a temperature from about 2,300° to 2,800° F. for a time sufficiently long to produce a semi-conductor body having the requisite apparent porosity of from 20 to 40 percent.

2 Claims, No Drawings

ELECTRICALLY SEMI-CONDUCTING CERAMIC BODY

REFERENCE TO RELATED APPLICATIONS

This is a continuation-in-part of application Ser. No. 321,563, filed Jan. 8, 1973, now abandoned.

DEFINITIONS

The terms "percent" and "parts" are used herein to refer to percent and parts by weight, unless otherwise indicated.

The term "apparent porosity" is used herein to refer to volume percent open porosity of a body.

BACKGROUND OF THE INVENTION

This invention relates to a method for producing a semi-conductor body useful in a jet engine igniter of the high energy type. In service such an igniter is fired by a capacitor discharge ignition system. The semi-conductor body is incorporated in the high energy igniter so that a portion of a surface thereof is adjacent a spark gap between a center electrode and a ground electrode. It has been found that a semi-conductor, so positioned, reduces the voltage required to cause a spark discharge, by comparison with an igniter where there is an alumina insulator in this position. Although the mechanism by which a semi-conducting body operates to reduce the voltage requirement is not fully understood, two theories have been proposed. These theories are stated below, but the statement should in no way be construed as a limitation on the scope of this invention.

One theory suggests that when a voltage is applied to the center electrode, there is a limited flow of current along the semi-conductor surface. This current flow causes ionization of gas in the spark gap. The ionization enables a spark discharge to occur at a lower voltage than would be required without the ionization.

Another theory suggests that because a small space of about 0.0005 inch exists between the center electrode and the semi-conducting body, electrical charges of opposite polarity build up on the surfaces of the center electrode and of the semi-conductor, as in the polarization of opposing faces of a capacitor. Ionization of gas in this small space or microgap within the igniter gap enables an initial spark discharge at a low applied voltage. This partial discharge is believed to cause a cascade ionization and discharge across the main gap.

In either case, discharge of the previously charged capacitor occurs when there is a spark between the ground and center electrodes. The large size of the capacitor is responsible for the high energy nature of the spark.

An extension of the second theory proposes that the porosity of the semi-conductor surface assists the cascade process by providing a series of microgaps between conducting silicon carbide grains which may become charged, ionized and discharged in rapid succession. The presence of a non-conducting phase such as glass or alumina serves not only to bond the conducting grains of silicon carbide, but also to prevent a direct short circuit. Controlled spacing and contact of the silicon carbide grains is obtained by means of the porosity and the glass or alumina as well as the grain size and amount of silicon carbide.

Various electrically semi-conducting ceramic bodies have heretofore been suggested and used in igniters for low voltage ignition systems. The prior art has emphasized, insofar as semi-conductors containing silicon carbide are concerned, such semi-conductors having a crystalline bonding phase. For example, U.S. Pat. No. 3,558,959 discloses alumina and silicon carbide semi-conductors having a crystalline bond produced by hot pressing the alumina and silicon carbide. U.S. Pat. Nos. 3,376,367 and 3,573,231 disclose the production of crystalline bonded semi-conductors from silicon carbide and aluminum silicate or the like by forming an article of the desired shape, firing in air to achieve a controlled oxidation of silicon carbide to silica, embedding the article in a mass of silicon carbide particles, and firing the article while so embedded. Alternatively, the aluminum silicate can be a part of the batch from which the original shape is formed. In either case the bonding phase is a crystalline aluminum silicate or the like.

The patents described above disclose high energy igniters containing silicon carbide and a bonding matrix which is essentially a crystalline phase. While these crystalline bonded igniters perform well under service conditions, several advantages are obtained with a bonding matrix that is a glass. With such a matrix a lower firing temperature can be used and the porosity of the fired semi-conductor can be controlled more effectively to obtain an increased open porosity, and decreased spark erosion rate.

A silicon carbide semi-conductor having a glassy bonding phase can be produced from a shape of a particular composition by a two-step firing procedure. The shape is first fired in air to reduce the size of the silicon carbide and to introduce $SiO_2$, and is then fired in an inert atmosphere. An igniter including a silicon carbide semi-conductor having a glassy bonding phase has been produced commercially since 1973. The semi-conductor composition, after firing, was 30.0 percent $SiO_2$, 9.0 percent $Al_2O_3$, 7.2 percent CaO, 1.8 percent MgO and 52 percent SiC. The glassy bonding phase of this semi-conductor contained 62.5 percent $SiO_2$. 18.8 percent $Al_2O_3$ and 18.8 percent CaO plus MgO. The production of semi-conductors by the two-step firing procedure is described in detail in the parent co-pending application Ser. No. 321,563, filed Jan. 8, 1973, now abandoned; it can be used to produce semi-conductors where the composition of the glassy bonding phase, after firing, is from 48.8 to 71.5 percent $SiO_2$; from 13.6 to 32.7 percent $Al_2O_3$; and from 9.1 to 30.1 percent CaO and MgO.

An improved semi-conductor having a substantially reduced erosion rate when sparked at a pressure of 400 psi. has now been discovered. The improved semi-conductor has an apparent porosity of 20 to 40 and consists essentially of silicon carbide particles dispersed in a bonding matrix; it can be produced by a one-step firing in an inert atmosphere, by the two-step procedure discussed in the preceding paragraph, and, perhaps, by hot pressing. The method, in any case, involves careful control of the apparent porosity of the semi-conductor body; the composition of the bonding matrix appears to be of only minor importance.

SUMMARY OF THE INVENTION

The instant invention is based upon the discovery of an improved silicon carbide semi-conductor having an apparent porosity from 20 to 40, and consisting essentially of silicon carbide particles dispersed in a bonding matrix. The matrix, in a preferred embodiment, constitutes from 55 to 70 parts of the body, and consists essentially of from 10 to 70 percent of at least one oxide of calcium, magnesium, barium or strontium, from 20 to 75 percent SiO$_2$ and from 10 to 40 percent Al$_2$O$_3$. The silicon carbide particles have a median particle size from about 3 to about 25 microns. The preferred semiconductor can be produced by milling a mixture of appropriate composition, forming the milled mixture into a shape, and bringing the shape in an inert gas atmosphere to a temperature from 2,300° to 2,800° F. for a period of time sufficient to produce a body having the requisite apparent porosity of from 20 to 40 percent. As indicated above, an electrically semi-conducting body according to the invention has improved resistance to erosion when incorporated in an igniter which is sparked at a pressure of 400 psi. The low thermal conductivity imparted by the high porosity of a semiconductor according to the invention is believed to minimize conduction of the heat at a high temperature generated by the spark discharge, so that, as a consequence, essentially only the surface of the body is subjected to excessively high temperatures. This tends to limit the destructive melting and expansion stresses to the surface. In general, it is preferred that the surface electrical resistance, measured at 500 volts D.C., of a body according to the invention be between 1 and 200 megohms.

Accordingly, it is an object of the present invention to provide an improved silicon carbide semi-conductor.

It is a further object of the present invention to provide a method for producing a silicon carbide semi-conductor having an electrically non-conducting glass bonding phase.

DESCRIPTION OF THE PREFERRED EMBODIMENTS

The production of silicon carbide semi-conductor bodies having a glass bonding phase is described in the following Examples, which illustrate the best presently known modes. Examples 1–7 disclose a preferred bonding composition, and the production therewith of semiconductors at two different silicon carbide contents and at different apparent porosities, while Examples 8–10 illustrate a second and Examples 11–14 a third preferred bonding composition and the production therewith of semi-conductors of different silicon carbide contents and of different porosities.

EXAMPLE 1

A batch of 65 parts substantially 600 mesh silicon carbide, 10.7 parts Al$_2$O$_3$, 12.2 parts SiO$_2$, 11.5 parts whiting*, 11.3 parts dolomite** and ½ part oleic acid was milled for two hours in a ball mill. The milled batch was mixed with 17 parts of a 25 percent solution of paraffin wax in Stoddard solvent and dried. Bored cylinders having an outside diameter of about 0.5 inch, an inside diameter of about 0.1 inch and a height of about 0.3 inch were then pressed from the milled charge under a pressure of about 20,000 pounds per square inch.
*CaCO$_3$; the sample used as described in this and other examples contained 55.2 percent CaO.
**The sample of dolomite used as described in this and other examples contained 30.5 percent CaO and 21.6 percent MgO.

The cylinders were heated to about 1000° F. in air to volatilize the paraffin, cooled and placed on a silicon carbide bed in a molybdenum boat. The boat was then placed inside a tube, and the tube was purged with helium. The tube and the cylinders contained therein were then heated to 2600° F., held at that temperature for one hour and cooled to 700° F. The tube was purged continually with helium during the entire heating cycle to maintain a helium atmosphere therein. Heating to 2600° F. required about three-fourths hour, while cooling from 2600° F. to 700° F. required about 1¾ hours. The boat and the fired semi-conductors were then removed from the tube. The fired semi-conductors were ground so that the bore had a diameter of 0.1 inch, the outside diameter was 0.35 inch and the height was 0.27 inch. The resistance of the buttons, measured with a 500 volt Megger, was found to be 75 megohms. The ground buttons were then placed in a sparking fixture, spring loaded in position so that a portion of one flat surface of each was in mechanical and electrical contact with the ground electrode of the fixture, and spaced by 0.001 to 0.002 inch from a center electrode thereof, spark gap 0.050 inch. The minimum voltage required to sustain sparking in an ignition circuit which included a 1.5 microfarad condenser was found to be 1650 volts under atmospheric pressure. Subsequently, the minimum voltage required to sustain sparking on the same piece was found to be 1020 volts under a pressure of 100 pounds per square inch gauge. Thereafter, the minimum voltage required to sustain sparking on the same piece was found to be 750 volts under a pressure of 400 pounds per square inch gauge. The ground semi-conductors, mounted in the assembly, were sparked for one hour at 12 joules under a pressure of 100 pounds per square inch gauge, 70 sparks per minute, and the erosion measured as weight loss in grams, was found to be 0.0004. Under a pressure of 400 pounds per square inch gauge, the erosion was found to be 0.0025. After sparking for thirty minutes under a pressure of 400 pounds per square inch gauge, it was estimated that sparking had occurred along 17 percent of the available surface of the buttons. The ignition system, during the erosion test described above, supplied 2000 volts, and had a total capacitance of 6 microfarads.

During firing, in the procedure described above in Example 1, the whiting and the dolomite were converted to oxides, with evolution of carbon dioxide. On an oxide/carbide basis the semi-conductors produced as described contained 65 percent silicon carbide, 10.7 percent Al$_2$O$_3$, 12.2 percent SiO$_2$, 9.7 percent CaO and 2.4 percent MgO. The semi-conductors consisted essentially of silicon carbide particles dispersed in a glassy bonding matrix; the matrix constituted 35 percent of the total, so its overall composition can be calculated by dividing each of the foregoing percentages by 0.35. This composition is 34.8 percent SiO$_2$, 30.4 percent Al$_2$O$_3$, 27.8 percent CaO and 7.0 percent MgO.

The procedure described above in Example 1 has been repeated, either precisely or with the variation noted below, to produce semi-conductors from different batches. In some cases, denatured alcohol, 125 parts, was substituted for the oleic acid; where this occurred, the milling time of the batch was increased to 4 hours. The identities of several of the batches are set forth in the following Table:

| | BATCH COMPOSITION, PARTS | | | | | | | |
|---|---|---|---|---|---|---|---|---|
| | SiC | | | | | | Denatured | |
| Example | Percent | Mesh | Al$_2$O$_3$ | SiO$_2$ | CaCO$_3$ | Dolomite | Alcohol | Oleic Acid |
| 2 | 60 | 600 | 12.2 | 13.8 | 13.1 | 12.9 | 125 | — |
| 3 | 65 | 600 | 10.7 | 12.2 | 11.5 | 11.3 | 125 | — |

-continued

| | BATCH COMPOSITION, PARTS | | | | | | | |
|---|---|---|---|---|---|---|---|---|
| | SiC | | | | | | Denatured | |
| Example | Percent | Mesh | Al$_2$O$_3$ | SiO$_2$ | CaCO$_3$ | Dolomite | Alcohol | Oleic Acid |
| 4 | 54 | 600 | 14.0 | 16.0 | 15.1 | 14.8 | 125 | — |
| 5 | 27/27 | 400/800 | 14.0 | 16.0 | 15.1 | 14.8 | 125 | — |
| 6 | 22/32 | 400/800 | 14.0 | 16.0 | 15.1 | 14.8 | 125 | — |
| 7 | 54 | 600 | 14.0 | 16.0 | 15.1 | 14.8 | 125 | — |
| 8 | 65 | 600 | 7.0 | 21.0 | 6.6 | 6.5 | — | ½ |
| 9 | 54 | 600 | 9.2 | 27.6 | 8.7 | 8.5 | 125 | — |
| 10 | 60 | 600 | 8.0 | 24.0 | 7.5 | 7.4 | — | ½ |
| 11 | 65 | 600 | 10.6 | 17.5 | 6.1 | 6.7 | 125 | — |
| 12 | 27/27 | 400/800 | 14.0 | 23.0 | 8.0 | 8.8 | 125 | — |
| 13 | 24/36 | 400/800 | 12.2 | 20.0 | 7.0 | 7.7 | 125 | — |
| 14 | 26/39 | 400/800 | 10.6 | 17.5 | 6.1 | 6.7 | 125 | — |

The properties and performance of the ground semi-conducting bodies of Examples 2 through 14, determined as described above, are set forth in the following Table:

TABLE

| | Voltage Requirement at 1.5 Microfarad for Sustained Sparking | | | Spark Erosion Rate (gm/hr) | | Apparent Poros. | Resistance Megohms ¼" | % Area Sparked 30 Minutes |
|---|---|---|---|---|---|---|---|---|
| Example | Atm. | 100 psi | 400 psi | 100 psi | 400 psi | (Av.) | Probe | 400 psi |
| 2 | 1650 | 1030 | 800 | 0.0004 | 0.0045 | 32.1 | 20 | 35 |
| 3 | 1625 | 740 | 550 | 0.0004 | 0.0040 | 35 | 70 | 25 |
| 4 | 1500 | 1350 | 1290 | 0.0008 | 0.0098 | 21.2 | 45 | 57 |
| 5 | 1690 | 790 | 920 | 0.0006 | 0.0069 | 29 | >200 | 38 |
| 6 | 1420 | 1020 | 890 | 0.0002 | 0.0080 | 22.1 | 200 | 42 |
| 7 | 1500 | 1350 | 1290 | 0.0008 | 0.0098 | 21.2 | 45 | 57 |
| 8 | 1380 | 1240 | 940 | 0.0001 | 0.0008 | 30.7 | >200 | 11 |
| 9 | 1750 | 1240 | 1090 | 0.0007 | 0.0089 | 22.2 | 120 | 45 |
| 10 | 1300 | 650 | 440 | 0.0002 | 0.0025 | 35.9 | 170 | 25 |
| 11 | 1870 | 1390 | 840 | 0.0001 | 0.0015 | 26.7 | >200 | 18 |
| 12 | 1400 | 930 | 630 | 0.0002 | 0.0051 | 21.5 | 170 | 32 |
| 13 | 1600 | 680 | 610 | 0.0002 | 0.0031 | 32.5 | >200 | 28 |
| 14 | 1130 | 530 | 370 | 0.0002 | 0.0019 | 38.4 | >200 | 27 |

The compositions of the bonding matrices of the bodies of Examples 2 through 14 are set forth in the following Table:

| | Bonding Matrix, Percent | | |
|---|---|---|---|
| Examples | SiO$_2$ | Al$_2$O$_3$ | CaO + MgO |
| 2–7 | 34.8 | 30.4 | 34.8 |
| 8–10 | 60 | 20 | 20 |
| 11–14 | 50.0 | 30.4 | 19.6 |

The body of Example 5 was also produced at an apparent porosity of 19.3, and the erosion rate, during sparking at 400 psi. was found to be 0.0129 gram per hour. By a comparison of this data with that given in Example 5 it will be noted that the apparent porosity of a body according to the invention strongly influences erosion rate during sparking at 400 psi. Specifically, at an apparent porosity of 19.3, the erosion rate during such sparking was also double that when the apparent porosity was 29.0. It has been found that further decreases in apparent porosity below the 19.3 value for the bodies of Example 5 cause further increases in erosion rate during such sparking.

The procedures described in all of the foregoing Examples describe a single firing in an inert atmosphere, specifically helium, to produce semi-conducting bodies. It has also been found that the two-step firing procedure to which reference is made above as being described in detail in co-pending parent application Ser. No. 321,563, now abandoned, can be modified to produce improved semi-conductor bodies of higher porosity and improved resistance to erosion when sparked at a comparatively high pressure. The procedure described in the following Example illustrates such modification of the two-step firing procedure.

EXAMPLE 15

A patch of 40 parts substantially 400 mesh silicon carbide, 40 parts substantially 800 mesh silicon carbide, 10 parts Al$_2$O$_3$, 14.3 parts CaCO$_3$, 2.9 parts Mg(OH)$_2$ and 125 parts denatured alcohol was milled for four hours in a ball mill. The milled batch was dried and mixed with 17 parts of a 25 percent solution of paraffin wax in Stoddard solvent. Bored cylinders having an outside diameter of about 0.5 inch, an inside diameter of about 0.1 inch and a height of about 0.3 inch were then pressed from the milled charge under a pressure of about 20,000 pounds per square inch.

The cylinders were heated to about 1000° F. in air to volatilize the paraffin, cooled and weighed. After weighing, the cylinders were fired in an electric furnace and in an air atmosphere to 2000° F. for 5 minutes. After cooling, the cylinders were reweighed and were found to have lost weight during this firing. In twelve samples the weight loss ranged from 0.9 to 2.5 percent. This weight loss was the consequence of the loss of carbon dioxide from calcium carbonate and of water from magnesium hydroxide, partially offset by the oxidation of silicon carbide to silicon dioxide. The cylinders were then placed on a silicon carbide bed in a molybdenum boat, and the boat was placed in a tube. The tube and cylinders were then heated to 2600° F., held at that temperature for 1 hour, and cooled to 700° F.; during this firing the tube was purged to maintain a helium atmosphere therein. Heating to 2600° F. required about ¾ hour, while cooling from 2600° to 700° F. required about 1¾ hours. The fired bodies had an apparent porosity of 31.9. Their composition has been calculated, based upon the weight loss after the five minute firing in air. Such calculations can be made by letting X equal the number of parts by weight of silicon carbide oxidized to silicon dioxide. The final body, then, contains 80 minus X parts of silicon carbide, 1.5 X parts of silicon dioxide, 10 parts of alumina, 8 parts of calcium oxide and 2 parts of magnesium oxide. The sum of these divided by the initial weight, 107.2 parts, is the fraction representing the weight loss during firing: 0.991 in the case of a 0.9 percent loss and 0.975 in the case of a 2.5 percent loss. The calculated compositions were as follows:

|  | 0.9% Loss | 2.5% Loss |
|---|---|---|
| $SiO_2$ | 17.6 | 12.9 |
| SiC | 53.6 | 68.2 |
| $Al_2O_3$ | 9.4 | 9.5 |
| CaO | 7.5 | 7.6 |
| MgO | 1.9 | 1.9 |

The fired bodies had an apparent porosity of 31.9; they were tested as described above, with the results set forth below:

| Voltage Requirement at 1.5 Microfarad for Sustained Sparking | | | Spark erosion rate (gm/hr) | | Apparent Porosity | Resistance, Megohms, 1/8" Probe | (%) Area Sparked 30 Minutes |
|---|---|---|---|---|---|---|---|
| Atm. | 100 psi | 400 psi | 100 psi | 400 psi | (Avg) | | 400 psi |
| 1220 | 600 | 520 | 0.0001 | 0.0019 | 31.9 | >200 | 17 |

When, for purposes of comparison, but not according to the instant invention, the procedure of Example 15 was repeated except that the initial firing in air was to 2070° F., 60 minutes at temperature, and the second firing, in helium, was to 2625° F., the fired bodies contained 54.2 percent silicon carbide, 27.6 percent silica, 9.2 percent $Al_2O_3$, 7.1 percent CaO and 1.9 percent MgO and had an apparent porosity of 17.9 percent. Buttons produced as described in this paragraph but at an apparent porosity of 19.9, and sparked as described above at 400 psi., eroded at a rate of 0.0183 gram per hour.

Semi-conducting bodies were produced as described above in Example 1, except that the batch was milled four hours with denatured alcohol, and no oleic acid was used, from 27 parts 400 mesh silicon carbide, 27 parts 800 mesh silicon carbide and 46 parts, on an oxide basis, bonding matrix. The compositions of the bonding matrices, and the properties and performance of the conducting bodies so produced, determined as described above, are set forth in the following Table:

| Example | Bonding Matrix, Percent | | | | Voltage Requirement at 1.5 Microfarad for Sustained Sparking | |
|---|---|---|---|---|---|---|
| | $Al_2O_3$ | $SiO_3$ | CaO | MgO | Atm. | 100 psi. |
| 16 | 40 | 40 | 16 | 4 | 1270 | 910 |
| 17 | 40 | 30 | 24 | 6 | 1360 | 810 |
| 18 | 50 | 40 | 8 | 2 | 820 | 450 |
| 19 | 50 | 30 | 16 | 4 | 1150 | 970 |
| 20 | 50 | 20 | 24 | 6 | 1140 | 760 |
| 21 | 60 | 30 | 8 | 2 | 1330 | 600 |
| 22 | 60 | 20 | 16 | 4 | 1430 | 610 |
| 23 | 70 | 20 | 8 | 2 | 1480 | 910 |
| 24 | 40 | 50 | 10 | | 1170 | 950 |
| 25 | 40 | 20 | 40 | | 1390 | 940 |

| Example | Spark erosion rate (gm./hr.) | | Apparent Porosity (avg.) | Resistance, megohms, 1/8" probe | (%) Area Sparked, one hour, 100 psi. |
|---|---|---|---|---|---|
| | 100 psi | 400 psi | | | |
| 16 | 0.0004 | n.d.* | 21.9 | 200 | 18 |
| 17 | 0.0005 | n.d. | 21.4 | 200 | 27 |
| 18 | 0.0004 | n.d. | 25.8 | 200 | 28 |
| 19 | 0.0002 | n.d. | 27.4 | 200 | 28 |
| 20 | 0.0004 | n.d. | 24.4 | 200 | 25 |
| 21 | 0.0001 | 0.0033 | 29.7 | 200 | 22 |
| 22 | 0.0001 | 0.0033 | 27.8 | 200 | 22 |
| 23 | 0.0001 | 0.0035 | 29.4 | 200 | 13 |
| 24 | 0.0009 | n.d. | 24.7 | 200 | 25 |
| 25 | 0.0005 | n.d. | 19.4 | 200 | 27 |

*Not determined.

Semi-conductors of a preferred family according to the invention have a glassy bonding matrix. The overall composition of the preferred bonding matrix can vary widely, preferably containing from 15 percent to 75 percent of $SiO_2$, from 10 percent to 80 percent of $Al_2O_3$ and from 10 percent to 70 percent of at least one alkaline earth oxide. It has been found that the glassy bonding matrix can contain, in some instances, a crystalline material, e.g., alumina, mullite, cristobalite, quartz, or any of various alkaline earth metal silicates. The presence of the crystalline material has not been found to be detrimental, provided that the body has an apparent porosity within the indicated limits, i.e., from 20 to 40 percent.

It will be apparent that various changes and modifications can be made from the specific disclosure hereof without departing from the spirit and scope of the invention as defined in the appended claims.

What I claim is:

1. A fired, electrically semi-conducting ceramic body having an apparent porosity from 20 to 40 and improved resistance to erosion, and consisting essentially of silicon carbide particles having a median particle size from about 3 to about 25 microns dispersed in a bonding matrix, said silicon carbide particles constituting from about 50 to about 70 percent of the body.

2. A fired, electrically semi-conducting ceramic body as claimed in claim 1 wherein said bonding matrix is glassy, and said matrix and any secondary crystalline phase present consist essentially of from 15 percent to 75 percent of $SiO_2$, from 10 percent to 80 percent of $Al_2O_3$ and from 10 percent to 70 percent of at least one alkaline earth oxide.

* * * * *